Figure 1A:
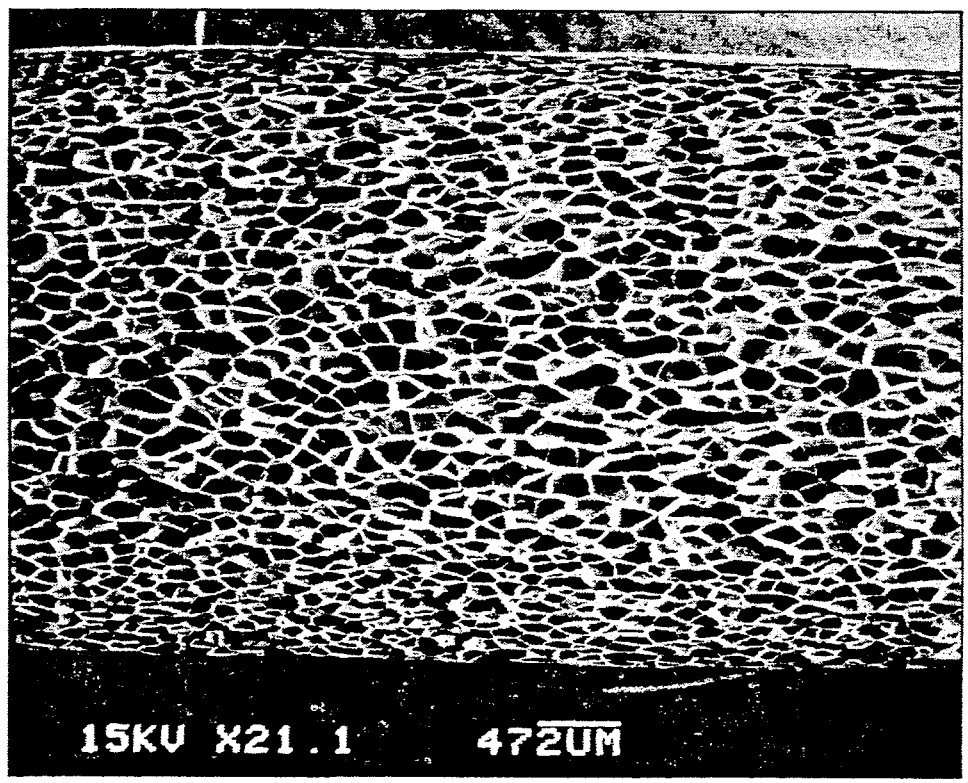

United States Patent [19]

Kretzschmann et al.

[11] Patent Number: 5,225,107

[45] Date of Patent: Jul. 6, 1993

[54] NUCLEATING AGENTS (PORE REGULATORS) FOR THE PREPARATION OF DIRECTLY GASSED THERMOPLASTIC FOAMS

[75] Inventors: Günther Kretzschmann, Münster-Sarmsheim; Dieter Scholz, Gau-Algesheim; Karl-Heinz Hilgert, Ingelheim am Rhein, all of Fed. Rep. of Germany

[73] Assignee: Boehringer Ingelheim GmbH, Ingelheim, Fed. Rep. of Germany

[21] Appl. No.: 950,101

[22] Filed: Sep. 23, 1992

Related U.S. Application Data

[63] Continuation of Ser. No. 875,809, Apr. 28, 1992, abandoned, which is a continuation of Ser. No. 756,644, Sep. 9, 1991, abandoned, which is a continuation of Ser. No. 569,106, Aug. 17, 1990, abandoned, which is a continuation of Ser. No. 461,194, Jan. 5, 1990, abandoned, which is a continuation of Ser. No. 337,681, Apr. 13, 1989, abandoned, which is a continuation of Ser. No. 230,279, Aug. 5, 1988, abandoned, which is a continuation of Ser. No. 883,192, Jul. 8, 1986, abandoned.

[30] Foreign Application Priority Data

Jul. 11, 1985 [DE] Fed. Rep. of Germany ....... 3524704

[51] Int. Cl.$^5$ ............................. C09K 3/00; C08J 9/08
[52] U.S. Cl. ....................................... 252/350; 521/91; 521/92; 521/97
[58] Field of Search ............................. 521/91, 92, 97; 252/350

[56] References Cited

U.S. PATENT DOCUMENTS

| | | | |
|---|---|---|---|
| 4,456,572 | 6/1984 | Euguchi et al. ..................... | 521/910 |
| 4,522,955 | 6/1985 | Fukushima ........................... | 521/143 |
| 4,632,942 | 12/1986 | Ito et al. ............................... | 521/92 |
| 4,638,015 | 1/1987 | Bertrand ............................. | 521/85 |

*Primary Examiner*—Morton Foelak
*Attorney, Agent, or Firm*—D. E. Frankhouser; A. R. Stempel; M-E. M. Timbers

[57] ABSTRACT

The invention relates to new nucleating agents for the preparation of directly gassed thermoplastic foams. The new agents comprise a combination of citric acid, the salts or esters thereof and carbonate or bicarbonate and talc.

1 Claim, 4 Drawing Sheets

NUCLEATING AGENTS (PORE REGULATORS) FOR THE PREPARATION OF DIRECTLY GASSED THERMOPLASTIC FOAMS

This is a continuation of application Ser. No. 875,809, filed Apr. 28, 1992 (abandoned) which is a continuation of application Ser. No. 756,644, filed Sep. 9, 1991 (abandoned) which is a continuation of application Ser. No. 569,106, filed Aug. 17, 1990 (abandoned), which is a continuation of application Ser. No. 461,194 filed Jan. 5, 1990 (abandoned), which is a continuation of application Ser. No. 337,681 filed Apr. 13, 1989 (abandoned), which is a continuation of application Ser. No. 230,279 filed Aug. 5, 1988 (abandoned), which is a continuation of application Ser. No. 883,192 filed Jul. 8, 1986 (abandoned).

The invention relates to a new nucleating agent (pore regulator) for the preparation of directly gassed thermoplastic foams.

It is known to add physically acting propellants (i.e. propellants with a boiling temperature below the processing temperature of the plastics) to the thermoplastic material when preparing structural foams. Nucleating agents are used as pore regulators to control the cell structure. One of the most frequently used nucleating agents is talc, which is generally added to the thermoplastic material in amounts of from 1.0 to 2.5%. The use of talc or other non-decomposing pore regulators as so-called "passive nucleating agents" has the disadvantage that when waste products from the plastics processing, the regenerated material, is reused the "passive nucleating agent" is always recycled into the process again, and it is very difficult to estimate the nucleating activity of the non-decomposed pore regulator from the regenerated material.

If solids such as talc are mixed with the plastics in concentrations of more than about 1%, the quality of the plastics, particularly its color, structure and gloss, are affected.

Therefore, so-called "active nucleating agents" are becoming increasingly important. "Active nucleating agents" are pore regulators which decompose during the extrusion or injection moulding process; the regenerated material then contains no (or at least fewer) constituents with a nucleating effect and can be reused without any substantial loss of quality.

Particular mention should be made of systems which cleave carbon dioxide, of which sodium bicarbonate or citric acid esters (DE-OS 34 11 319) or the combination of citric acid or sodium citrate with sodium bicarbonate or sodium carbonate (Japanese Patent 715 375) have been described. The citric acid/sodium bicarbonate system is effective as a pore regulator when added in amounts of from 0.4 to 1.0%.

It has now been found that mixtures of citric acid, citric acid esters or salts of citric acid with carbonates or bicarbonates as active nucleating agents with talc as the passive nucleating agent in a wide range of mixing ratios have better nucleation properties than the active or passive nucleating agents on their own.

The invention thus relates to an agent for nucleating directly gassed thermoplastic foams comprising a mixture of components A, B and C, wherein A represents citric acid, salts of citric acid with alkali or alkaline earth metals or ammonium salts of citric acid or mono- or diesters of citric acid with $C_1$ to $C_8$ alcohols;

B represents alkali, alkaline earth or ammonium carbonate or alkali, alkaline earth or ammonium bicarbonate; and C represents talc and this agent may, if desired, contain the conventional flow promoting agents, release agents and lubricants.

The two components A and B represent an active nucleating agent (propellant), while component C represents a passive nucleating agent.

The citric acid can be present in pure form or as a hydrate and in the form of its alkali, alkaline earth or ammonium salts. The salts of the monobasic citric acid are preferred, such as monosodium citrate, calcium citrate and monoammonium citrate or a 2:1 mixture of citric acid and trisodium citrate. Particular mention is made of monosodium citrate.

Suitable citric acid esters are the mono- and diesters of alcohols having up to 8 carbon atoms. Lower alcohols are methanol, ethanol, propanol, isopropanol, n-butanol, isobutanol, sec.-butanol, tert.-butanol, n-pentan-1-ol, n-pentan-2-ol, n-pentan-3-ol and the isomeric pentanols, n-hexan-1-ol, n-hexan-2-ol, n-hexan-3-ol and the isomeric hexanols, n-heptan-1-ol, n-heptan-2-ol, n-heptan-3-ol, n-heptan-4-ol and the isomeric heptanols, n-octan-1-ol, n-octan-2-ol, n-octan-3-ol, n-octan-4-ol and the isomeric octanols, cyclopentanol and cyclohexanol.

It is also possible to use esters of diols or polyols with up to 8 carbon atoms, such as ethyleneglycol, glycerol, pentaerythritol or lower polyethylene glycols with up to 8 carbon atoms, e.g. diethyleneglycol, triethyleneglycol or tetraethyleneglycol.

Particular mention is made of the mono- or diesters of monohydric alcohols with up to 6 carbon atoms.

The mono- or diesters of monohydric alcohols with up to 4 carbon atoms are preferred.

The monoesters such as monomethylcitrate, monoethylcitrate, monopropylcitrate, monoisopropylcitrate, mono-n-butylcitrate and mono-tert-butylcitrate are particularly preferred.

Monoesters according to the preceding definition include both the citric acid $\alpha$-esters and also the citric acid $\beta$-esters or mixtures of $\alpha$- and $\beta$-monoesters of any desired composition. By mixing the $\alpha$- and $\beta$-esters in any desired proportions it is possible to obtain mixtures with lower melting points than the pure esters.

Diesters in accordance with the preceding definition include both the $\alpha,\alpha'$-diesters of citric acid and also the $\alpha,\beta$-diesters or mixtures of the $\alpha,\alpha'$-and $\alpha,\beta$-diesters of citric acid.

By mixing the $\alpha,\alpha'$- and $\alpha,\beta$-diesters in suitable proportions it is possible to obtain mixtures with lower melting points than the pure diesters.

Diesters according to the preceding definition also include mixed esters of two different alcohols, and this term also includes all possible structurally-isomeric and stereoisomeric compounds in pure form or in any mixture.

The carbonate or bicarbonate component (B) used can be a carbonate or bicarbonate of the alkali metals or the alkaline earth metals or of ammonium. Sodium, potassium and calcium are preferred.

Particular mention is made of sodium carbonate and sodium bicarbonate.

The citric acid component (component A) is mixed with the carbonate or bicarbonate component (component B) preferably in a stoichiometric or nearly stoichiometric ratio, so that the free acid equivalents of component A serve formally to neutralise component B and as a result the optimum quantity of carbon dioxide is released.

The standard commercial grades of talc can be used as the talc (component C). Grades of talc which are also used for pharmaceutical preparations are preferred since these will be safe to eat and will therefore not affect the quality of the material in this respect. It should be particularly emphasised that these grades of talc do not contain any mineral fibres which could be harmful to the lungs.

The usual agents for improving flow or release agents or lubricants can be added to the mixture according to the invention.

These additives are generally known in the art. Examples include metal soaps such as calcium or zinc or magnesium stearate; paraffins; silicates such as aerosil; silicones, waxes; fats.

Suitable thermoplastics include:

polyethylenes; ethylene-vinylacetate copolymers; ethylene-ethylacrylates; ionomeric polyethylenes; polypropylenes; polybutenes; polymethylpentenes; polystyrenes; high-impact polystyrenes; styreneacrylonitrile copolymers; acrylicbutadiene-styrene copolymers; acrylonitritestyryl acrylate (ASA); polyvinylcarbazoles; polyvinylchlorides; polytrifluoroethylenes; polytetrafluoroethylene; perfluoropropylenes; polyvinylidene fluorides; ethylenetetrafluoroethylene copolymers; polymethylmethacrylates; polyamides; polyethyleneglycol terephthalates; polybutylene terephthalates; polyozymethylenes; polycarbonates; chlorinated polyethers; phenoxy resins; polyphenylene oxides; polysulphones; polyethersulphones; polyphenylenesulphides; polyurethane elastomers; cellulose acetates; cellulose propionates; cellulose-aceto-butyrates and other thermoplastics or elastomers.

The three components A, B and C can be mixed together as a finely ground free flowing powder. It is also possible to coat the mixture by conventional methods (to render it water-repellant) or to encapsulate it, while all three components can be encapsulated, coated or made water-repellant together or one or two components are first encapsulated, coated or made water-repellant and the remaining components are then added.

Numerous substances are suitable for encapsulating, coating or rendering water-repellant. Those substances which melt or are already molten at the temperatures conventional for thermoplastic melts but are solid or solidify in a waxy state at ambient temperature are preferred.

In addition to the numerous waxes, fatty acids and the esters and salts thereof are preferred; calcium stearate and magnesium stearate and the fatty acid glycerides are particularly suitable.

The ratio of talc (C) to the other two components (A+B) can be freely selected within the limits (C): (A+B) from 1:9 to 9:1. The range (C): (A+B) from 5:5 to 8:2 is preferred.

Particular mention is made of mixtures of monosodium citrate and sodium bicarbonate and talc and citric acid, sodium bicarbonate and talc.

It has proved advantageous if first of all the sodium bicarbonate on its own and/or the citric acid on its own is made water-repellant with calcium stearate or fatty acid esters, because these mixtures are particularly resistant to moisture in the air and will not go lumpy or decompose even when stored for lengthy periods.

For the citric acid esters, mixtures of monoisopropylcitrate with sodium hydrogen carbonate and talc are preferred. The liquid monoisopropylcitrate is encapsulated using methods known per se or may be incorporated in plastics in the form of batches.

The Figures are briefly described as follows:

FIG. 1a: Electron-microscope photograph of a longitudinal cross-section relative to the direction of extrusion of the polystyrene foam film according to Experiment 1.

Figure 1B:
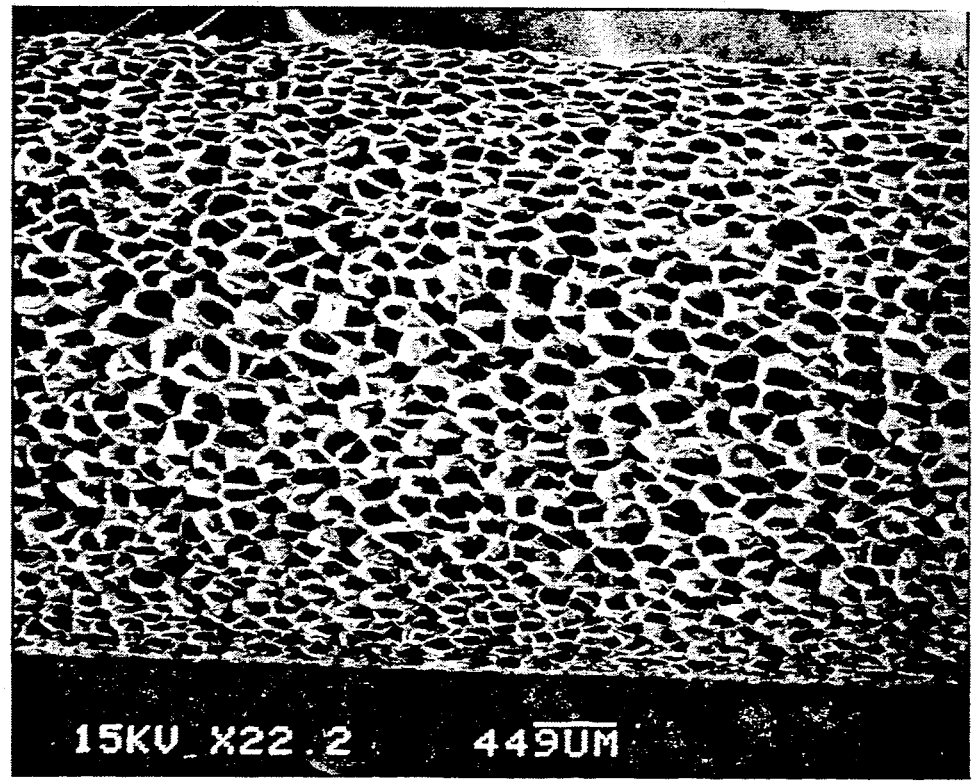

FIG. 1b: Electron microscope photograph of a cross-section at right angles to the direction of extrusion of the polystyrene foam film according to Experiment 1.

Figure 2A:
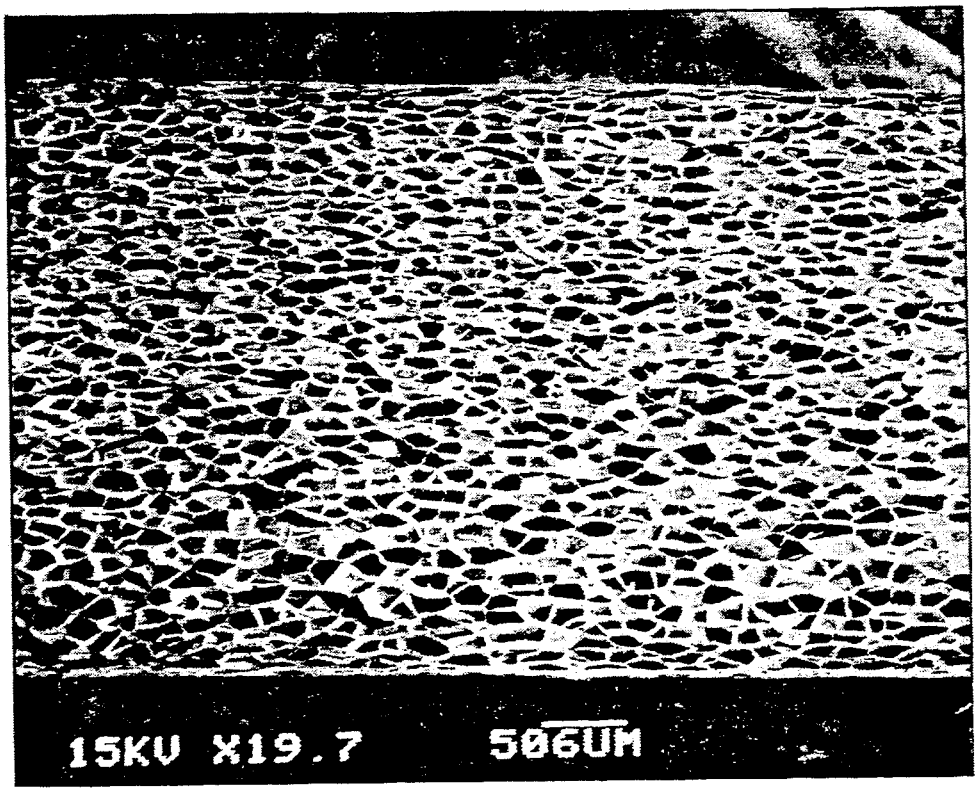

FIG. 2a: Electron microscope photograph of a longitudinal cross section relative to the direction of extrusion of the polystyrene foam film according to Experiment 3.

Figure 2B:
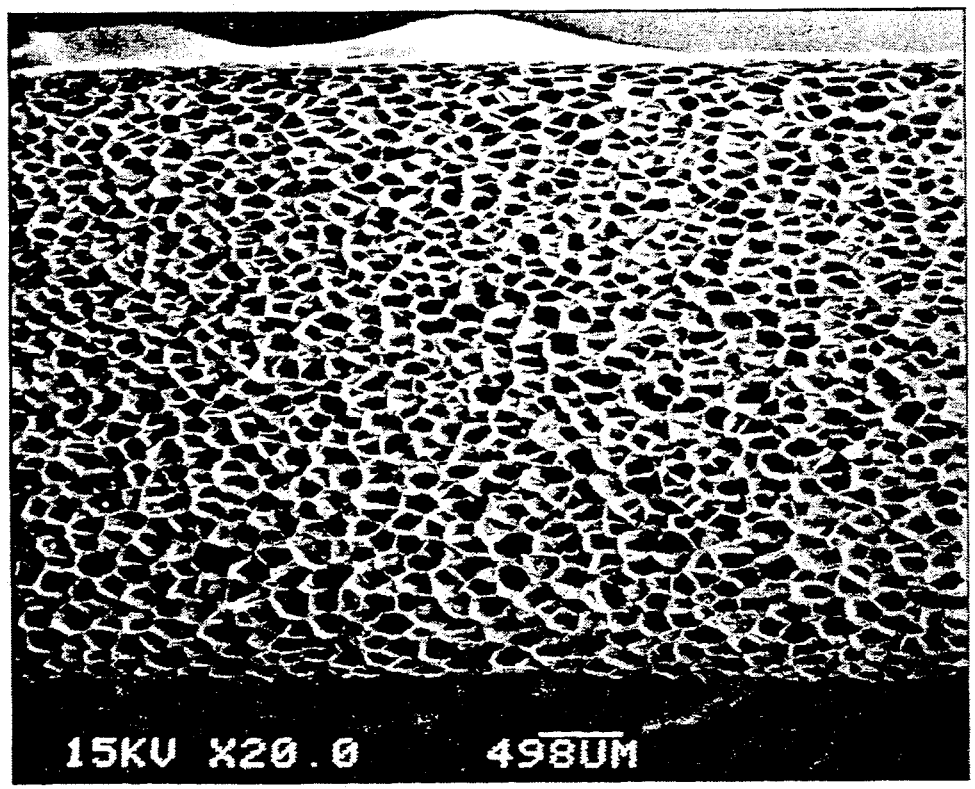

FIG. 2b: Electron microscope photograph of a cross-section at right angles to the direction of extrusion of the polystyrene foam film according to Experiment 3.

The following examples illustrate the prior art, where so indicated, and the present invention.

EXAMPLE 1

Preparation of directly gassed polystyrene structural foam films

The tests are carried out using a Berstoff-Tandem apparatus. 5–7% of a 1:1 mixture of trichloromonofluoromethane and dichlorodifluoromethane are used as propellant. The thermoplastic material used is industrial-grade polystyrene (type DOW 648).

The quantities of propellant and nucleating agent specified relate to the quantity of polystyrene used, and the addition of nucleating agent is varied (while the addition of propellant remains constant) until the polystyrene films have approximately the same cell structure. The film described in Experiment number 1 serves as the standard.

EXPERIMENT 1 (PRIOR ART)

Polystyrene: polystyrene of the Styron 648 type (made by Dow Chemicals).

Nucleating agent: 1.7% talc.

Results: uniform structure, film has a pale yellow shimmer.

EXPERIMENT 2 (PRIOR ART)

Polystyrene: polystyrene of the Styron 648 type.

Nucleating agent: 0.45% of a mixture of monosodium citrate and sodium bicarbonate (corresponding to Japanese Patent 715 375).

Results: fine uniform structure.

EXPERIMENT 3 (ACCORDING TO THE INVENTION)

Polystyrene: Polystyrene Dow 648

Nucleating agent:

0.35% talc, 0.09% of a mixture of monosodium citrate and sodium hydrogen carbonate (according to Japanese Patent 715 375).

Results: fine uniform structure with finer pores than in Experiment 1.

The electron-microscope pictures enclosed as Annex 1 and 2 are sections taken longitudinally and at right angles to the direction of extrusion of the foam film and demonstrate the improvement in pore quality.

EXAMPLES 4–6

Direct gassing of low density polyethylene (LDPE)

Single screw extruder with gassing device, tubular die (conventional construction for the manufacture of foam films).
LDPE: density about 0.918.
Melting index about 2.
Gas: R114-Frigene 114 (dichlorotetrafluoro ethane).
Quantity of gas: 4–5%.
Foam density: 0.3–0.4 g/ml.

EXPERIMENT 4: (PRIOR ART)

LDPE: as above.
Nucleating agent: 0.6–0.8% talc.
Result: uniform foam structure, color yellowy-grey.

EXPERIMENT 5 (PRIOR ART)

LDPE: as above.
Nucleating agent: 0.3–0.4% analogously to Experiment 2.
Result: uniform fine structure, color lighter than in Experiment 4.

EXPERIMENT 6

LDPE: as above.
Nucleating agent: 0.25–0.4% analogously to Experiment 3.
Result: uniform fine structure, color lighter than Experiment 4.

In checking and searching for better or more active systems, a three-component system, which is here in described, has been found to have higher or at least same activity as citric acid and sodium bicarbonate. Monosodium citrate, as a substitute for citric acid, has a high nucleation activity. This allows the processor adding much less solid material to a direct-gassing thermoplastic extrusion process. For this reason, the process can run more uniformly because by using reclaimed material less solid materials are left in the resin, i.e., decomposition and talc left in the material. Compared with use of talc by itself, there is always a very high, unreliable content of talc left in the reclaimed or reprocessed materials. This is evident in polystyrene directed-gassed forms such as films sheets or boards, and especially in the board extrusion where also other ingredients such as pigments, flame-retardants and modifiers are used together with nucleating agents.

EXAMPLE 7

The teachings of C.A. 88(14), 90726 K (REF. 1) were compared to the teachings of the present invention. The results are as follows:

| Components | Test A | Test B | Test C |
| --- | --- | --- | --- |
| citric acid (anhydrous) | 0.1% | 0.13% | |
| monosodium citrate | — | — | 0.09% |
| sodium bicarbonate | 0.2% | 0.17% | 0.07% |
| talc | 0.5% | 0.5% | 0.25% |
| Complete nucleating agent | 0.8% | 0.8% | 0.41% |

Test A: composition according to REF. 1
Test B: composition according to REF. 1 but using stoichiometric amounts of citric acid and sodium bicarbonate
Test C: composition according to the invention with stoichiometric amounts of monosodium citrate and sodium bicarbonate.

The resulting forms were practically of the same structure as according to Experiment 3. Surprisingly, this result was reached with about half of the amount of the composition according to the invention (0.41 instead of 0.8).

What is claimed is:

1. A composition for nucleating directly gassed thermoplastic foams comprising approximately 0.09% monosodium citrate, approximately 0.07% sodium bicarbonate and approximately 0.25% talc.

* * * * *